United States Patent [19]
Owen

[11] Patent Number: 6,061,982
[45] Date of Patent: May 16, 2000

[54] RAISED FLOORING SYSTEM AND METHOD

[76] Inventor: David D. Owen, 9 Sagebush La., Hilton Head Island, S.C. 29926

[21] Appl. No.: 09/032,265

[22] Filed: Feb. 27, 1998

[51] Int. Cl.[7] ....................................................... E04B 1/00
[52] U.S. Cl. ........................ 52/220.1; 52/126.4; 52/126.6; 52/263
[58] Field of Search ............................... 52/126.1, 126.2, 52/126.5, 126.6, 263, 220.1, 220.3, 220.5

[56] References Cited

U.S. PATENT DOCUMENTS

| | | |
|---|---|---|
| Re. 33,220 | 5/1990 | Collier . |
| Re. 35,369 | 11/1996 | Ducroux et al. . |
| 3,899,857 | 8/1975 | Mochizuki . |
| 4,319,520 | 3/1982 | Lanting et al. . |
| 4,368,869 | 1/1983 | Gelvezon et al. . |
| 4,606,156 | 8/1986 | Sweers et al. . |
| 4,676,036 | 6/1987 | Bessert . |
| 4,719,727 | 1/1988 | Cooper et al. . |
| 4,729,859 | 3/1988 | Munsey et al. . |
| 4,850,176 | 7/1989 | Munsey et al. . |
| 4,874,127 | 10/1989 | Collier . |
| 5,048,242 | 9/1991 | Cline . |
| 5,111,630 | 5/1992 | Munsey et al. . |
| 5,345,779 | 9/1994 | Feeney . |
| 5,363,613 | 11/1994 | Sevier . |
| 5,392,571 | 2/1995 | Greenfield . |
| 5,477,649 | 12/1995 | Bessert . |
| 5,483,776 | 1/1996 | Poppe . |
| 5,499,476 | 3/1996 | Adams et al. . |

OTHER PUBLICATIONS

Letter fron Interface Architectural Resources of Grand Rapids, Michigan.
"InterfaceAR" literature by Interface Architecture Resources.
"Intercell Cable Distribution System" literature by Interface Architectural Resources.
"C–Tec Series" literature by Interface Architectural Resources.
"Interstitial System" literature by Interface Architectural Resources.
"Intergy Modular Power System" literature by Architectural Resources.

Primary Examiner—Beth A. Aubrey
Attorney, Agent, or Firm—Watts, Hoffman, Fisher & Heinke

[57] ABSTRACT

A flooring system is disclosed which utilizes prefabricated base modules installed in side by side relationship. The modules have base panels with elongate corrugations which stiffen the panels in one direction. Pedestal strips with elongated corrugations are secured to the base panels with the corrugations of the strips and panels orthoganal to one another. The strips include a series of upstanding pedestals. The pedestal and end half pedestals are positioned such that when the modules are installed they provide a geometric pedestal array. The pedestals are notched to receive snap in panels which collectively define fluid conduit, power cable and communications chases. Working floor panels are mounted atop the pedestals. The power cable, communications and work floor panels have knock outs which are readily removable to provide access to the chases. A heat pump is connected to supply, return and condensate conduits installed in the conduit chase to supply cooling water from a cooling tower.

50 Claims, 5 Drawing Sheets

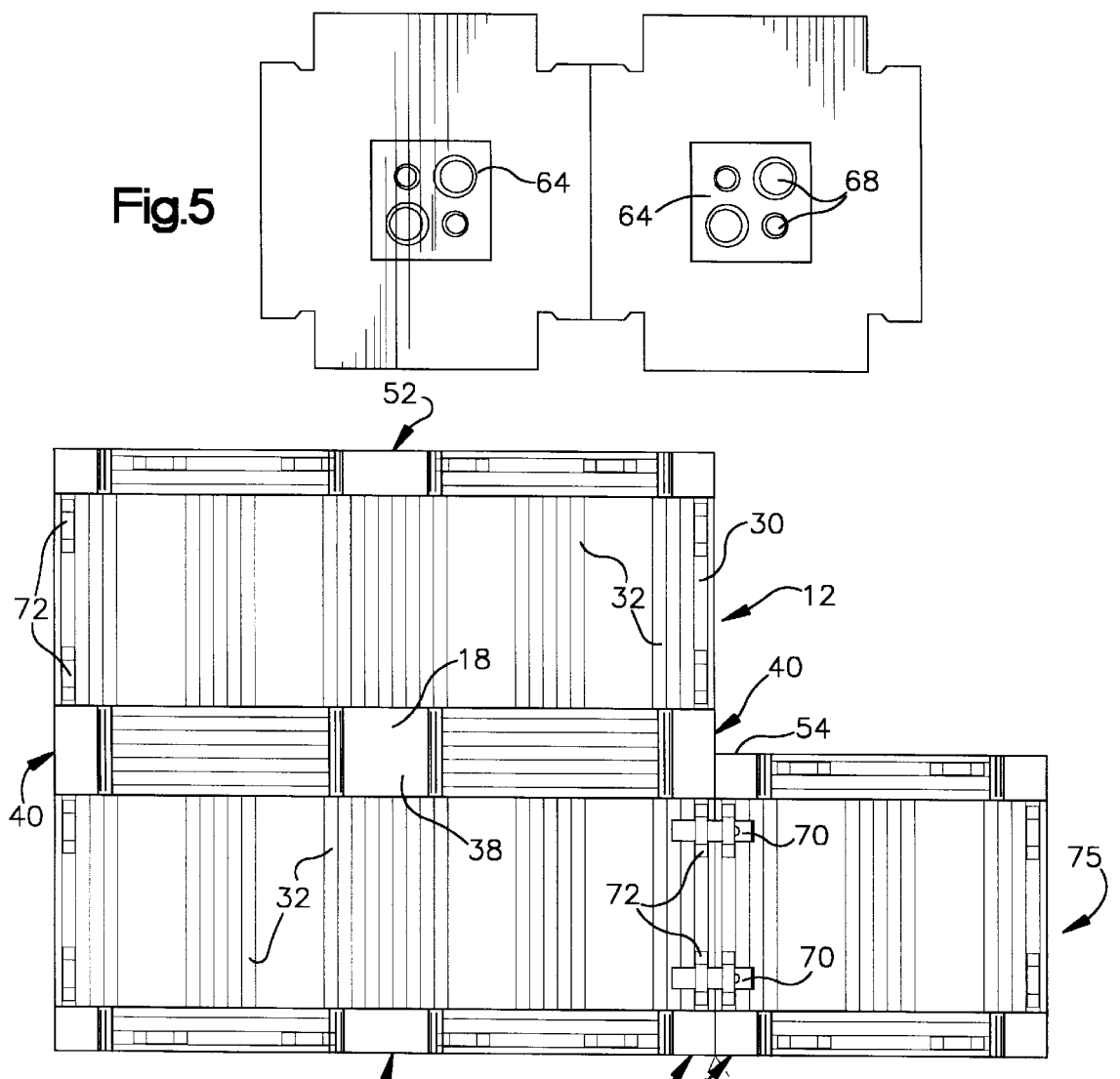

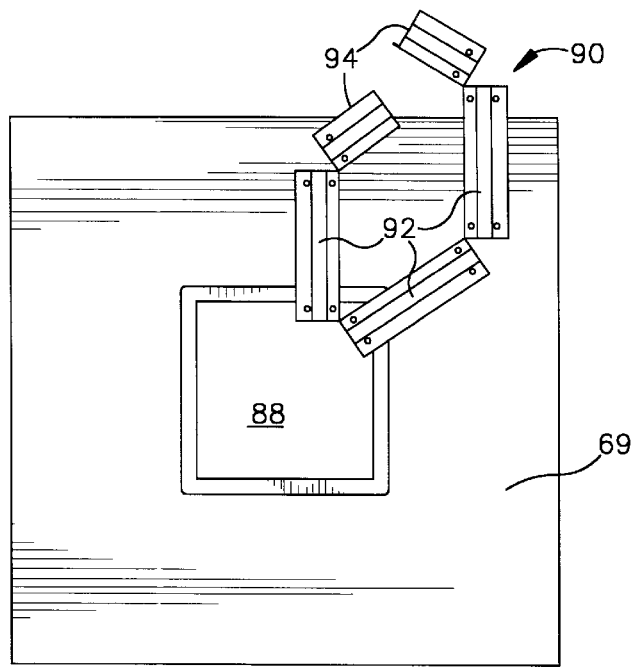
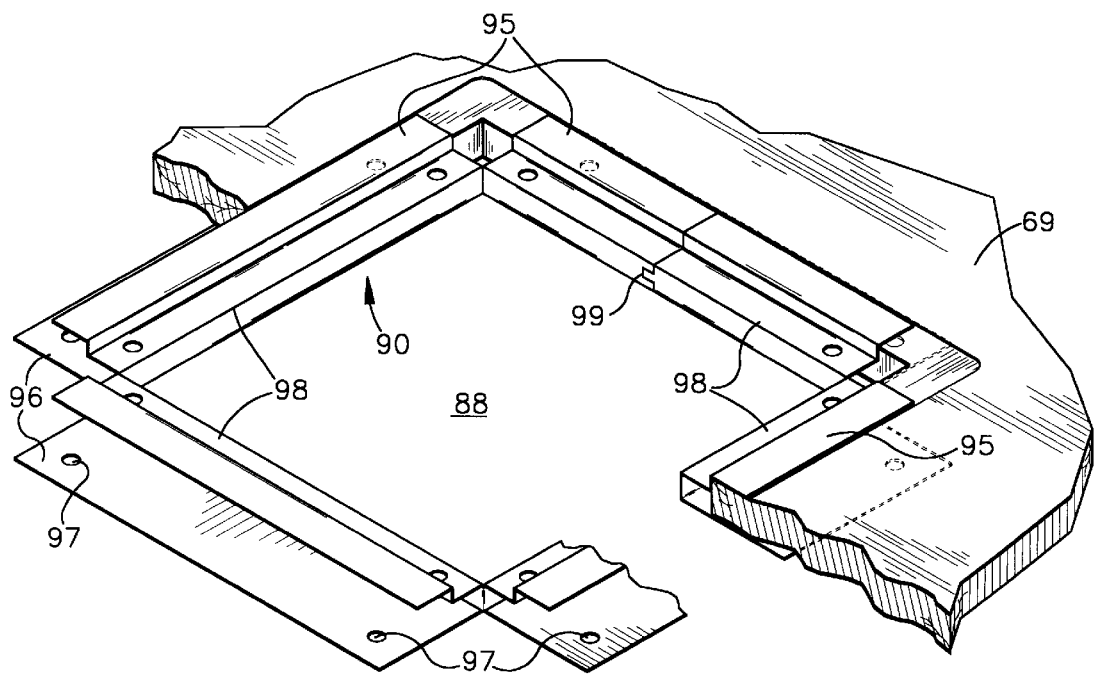
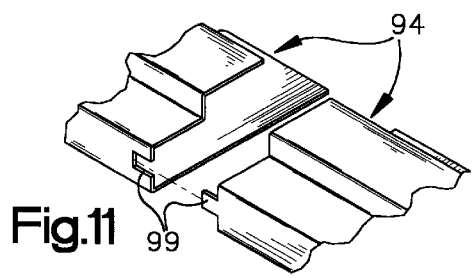

RAISED FLOORING SYSTEM AND METHOD

This invention relates to an accessible raised floor system for use in office buildings or the like.

BACKGROUND OF THE INVENTION

Historically, building owners have not had to deal with tenant requirements for supplemental cooling, power and cabling, with the exception of special purpose computer or trading rooms. These special purpose rooms have been dealt with almost as if they were separate structures. Unless a building was occupant owned, a tenant had to deal with these requirements. Now, due to the changes in market economies, frequently landlords are forced to solve problems of substantial increases in power requirements, additional cooling and cable distribution.

As the use of office space has evolved since the development of personal computers (PC), there has been an escalation in the need for and frequency of re-organization and re-configuration of office space. Enormous amounts of effort and study have gone into the planning and design of office space in order to render its use more flexible and sympathetic to user functions. Most of these efforts have been concentrated in modular space planning and systems furniture engineered to accommodate PCs.

Modern day office requirements have placed burdens on heating/cooling, electrical power distribution and cabling systems which were never anticipated when even the most modern office buildings were built. The rates of office reorganization and reconfiguration have escalated from about 10% to 15%, per year U.S. averages, in the early 1990's, to 35% to 50% in the mid 1990's, with some companies and industries exceeding 100% per year. The technological life expectancy of local and wide area networks cabling and connectors is currently about eighteen months to two years.

Physical concentrations of PCs and other electrical enhancements such as facsimile machines, copiers, printers, scanners, and in particular, the personnel operating the equipment, have placed extra-ordinary burdens on the most sophisticated and powerful heating, ventilating and air conditioning systems. These concentrations of equipment and personnel generated heat are most frequently offset by increasing the velocity of chilled air from overhead diffusers, usually at the expense of other areas, and to the discomfort of personnel.

Traditionally and technically there have been roughly seven predominant methods of distributing heating/cooling, electrical power and cable in horizontal planes from vertical sources, whether from a building core or from other vertical chases. They have been:

1) Through a ceiling plenum;

2) Through the use of conventional raised flooring systems, as have been used in computer rooms;

3) In-floor conduits or proprietary ducts;

4) A combination of plenum and under-floor distribution through rigid conduit into poke-through outlet boxes to the floor above;

5) Through stud and drywall partitions and/or column enclosures;

6) Through power poles; and,

7) Through system furniture panels.

All of these systems require the feeding of electrical power wiring and cabling through studding, systems furniture, in-floor conduit or ducts. Convenient, horizontal retro-feeding of electrical power wiring or cabling through finished stud and dry wall partitions is particularly difficult, costly, disruptive and sometimes, impossible unless sufficient conduit has been preinstalled.

The most flexible and common of these systems has been the use of ceiling plenums. This plenum approach has severe difficulties and limitations. All work must be performed from ladders or scaffolding. Most connections to work surfaces must be through stud and dry wall partitions or so-called power poles vertically to work surface or floor levels and then distributed horizontally using more stud and dry wall partitions, systems furniture or in-floor conduit or duct.

Once additional power is in place, an undesirable result is a comparable increase in generated heat, requiring more cooling. Typically such additional heat loads have not been anticipated nor dealt with in the base building design or construction.

Localized cooling solutions are being dealt with by trying to increase the output of existing systems such as pushing more air by using higher blower velocities. Increases in air velocities result in increased noise levels and are really nothing more than cycling air more rapidly through the base system which has a finite heat absorbing capacity.

There have been proposals for retrofitted auxiliary flooring systems all of which suffer distinct disadvantages. With one proposal, a lower forced air plenum would be provided for conducting supplemental cooling air to a workspace where heat generating electronic equipment has been installed. Other flooring components would be formed to define enclosed ducts above the air plenum for power cables and communication conductors. It is necessary that these enclosed ducts have imperforate walls to prevent spread of an electrical fire. In the event of such a fire, the egress of the supplemental conditioning air from the plenum would obviously be undesirable. It is for these reasons that building codes require all wiring be encased in fire resistant conduit.

Prior proposals for supplemental flooring systems have all been excessively complex such that they required skilled installers for disproportionately long periods of time. Further, prior proposed systems have not been fully modular and had inadequate provision for access to service lines extending through such a system.

Accordingly, there is a need for a simple to install supplemental flooring system which will quickly and flexibly accommodate power cable, communication wiring, and supplemental cooling to meet the demands of both current day and future electronic equipment.

SUMMARY OF THE INVENTION

The flooring system of the present invention utilizes prefabricated base modules which are preferably about 3' by 3' in horizontal dimension. These modules are installed in side by side relationship on an existing building floor. The modules are interconnected by sliding key tongues into key slots of adjacent modules. Leveling to accommodate irregularities of the building floor is achieved by adjusting leveling screws threaded into base panels of the modules.

The base panels each have elongate corrugations which stiffen the panel in one direction. Pedestal strips with their own elongated corrugations are secured to the base panels with the corrugations of the strips and panels orthoganal to one another so that together they provide a stiff module base. The pedestal strips have a series of upstanding pedestal portions. The pedestal portions are open sided, truncated pyramids each of which has oppositely, inwardly sloping side surfaces and a flat top surface. In the preferred embodiment further strips are secured to the base panel in orthogonal relationship to the pedestal strips. The further strips have upstanding portions which nest within the pedestal portions to close the sides of the pedestal portions.

The pedestal strips include end half pedestals at the juncture of a pedestal with a side edge of the base panel. When the modules are installed these half pedestals are butted together such that together they form a structure corresponding to full pedestals formed intermediate the ends of the strips. Similarly, four corner pedestals together form a structure corresponding to a full pedestal.

The tapering sides of the pedestals are notched to receive snap in steel panels. The snap in panels collectively define a power cable chase floor and a communications chase floor each above a base floor defined by the module base panels. The panels, like other components of the system, are preferably steel (1) to protect such things as data cabling from power cable induced magnetic fields, (2) for structural strength, and (3) for fire resistance.

Working floor panels are mounted atop the pedestals. Preferably these working floor panels are reinforced, steel clad, fire resistant plywood or other suitable material to provide an appropriate base for customary floor coverings such as carpet or tile.

The power cable, communications and work floor panels each have knock outs which are readily removable to provide access to cabling and wiring supported on the floors. They also provide access to fluid conduits supported on the base floor.

One of the outstanding features of the invention is the use of water conduits in combination with heat pumps for supplemental heating and cooling. Supply, return and condensate conduits are installed on the base floor to conduct supply water at temperatures of about 60° to 90° F. A preferred source for the cooling water is a typical cooling tower of the type which is commonly mounted atop an office building. The use of water totally obviates the need for hermetic barriers between a cooling plenum and power and communication cable chases. Moreover, since the water used is cool no pipe wrap is required.

Accordingly, the objects of the invention are to provide a novel and improved supplemental flooring system and methods of installing and operating such a system.

BRIEF DESCRIPTION OF THE DRAWINGS

FIG. 5 is a plan view of two snap in panels used to form cable and communication floors;

FIG. 6 is a plan view of modules of the present invention;

FIG. 9 is a plan view of an apertured service line floor panel with a reinforcing member shown in a position it passes through prior to being inserted in and secured to the panel;

FIG. 10 is a perspective view of a central portion of a finished service line floor panel with parts broken away and removed for clarity of illustration; and, FIG. 11 is a fragmentary, perspective view of a keyed section of the reinforcement of FIGS. 9 and 10.

DETAILED DESCRIPTION OF THE PREFERRED EMBODIMENT

Figure 1:
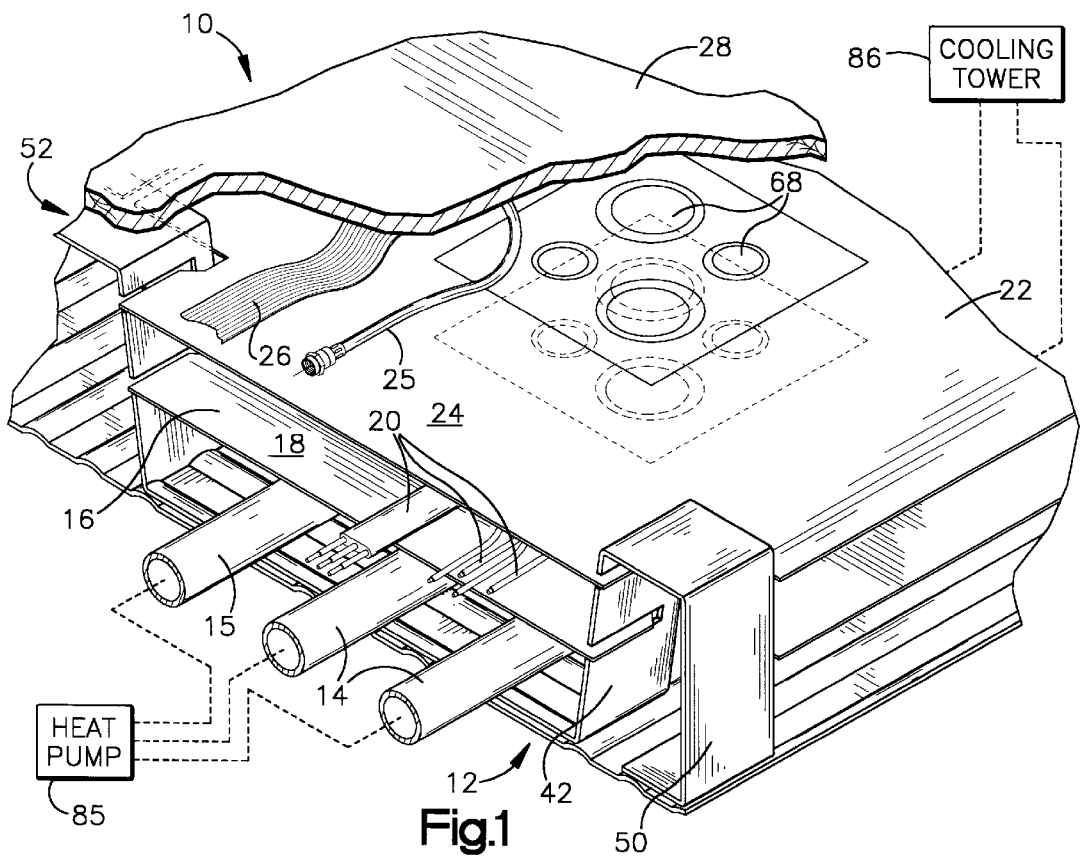
FIG. 1 is a fragmentary perspective view of a portion of a flooring system made in accordance with the present invention.

In FIG. 1, a flooring system made in accordance with the present invention is shown generally at 10. The system includes a modular base supporting supply and return water conduits 14 and a condensate conduit 15.

Cable floor panels 16 positioned above the conduits 14,15 form a floor for cable chase 18 supporting electrical cables and wires 20. Communication panels 22 define a floor beneath a communication chase 24. The communication chase houses communication cable 25 and data conductors 26 for such purposes as local area network interconnections.

A modular work floor 28 is mounted atop the modular base elements. The pictured work floor components 28 are ½" fire resistant plywood sheets which are steel clad for rigidity and fire resistance.

With the preferred construction, the overall depth of the system is approximately 4" with the lower water conduit chase having a vertical clearance of $1\tfrac{3}{8}$", the cable chase having a vertical clearance of $1\tfrac{1}{8}$" and the communication chase having a vertical clearance of $\tfrac{5}{8}$".

Figure 2:
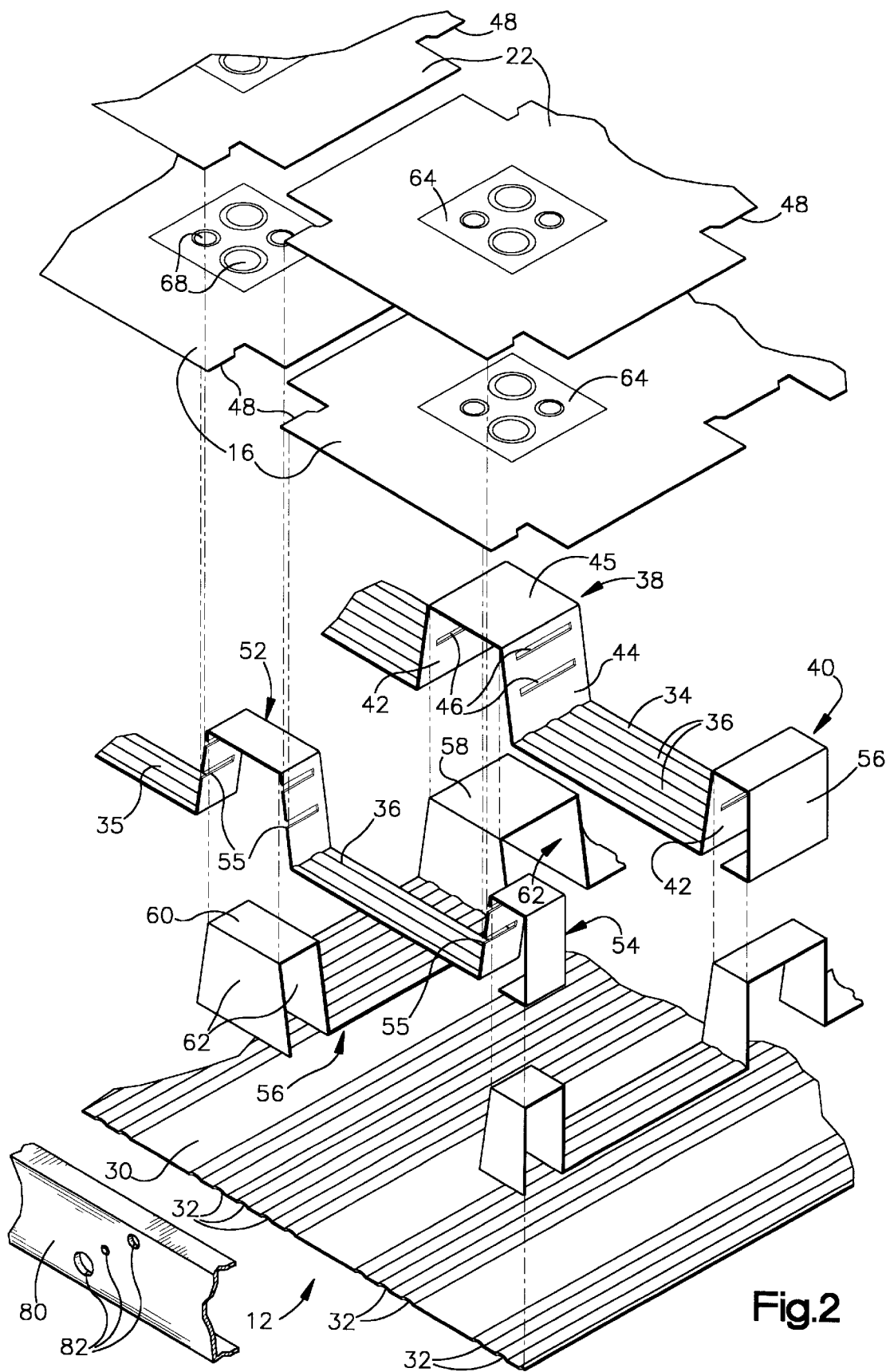
FIG. 2 is an exploded view of the preferred embodiment of the present invention.

Referring now to FIG. 2, the preferred embodiment of a base module 12 is shown in exploded form. The base module 12 includes a base panel 30 having sets of stiffening ribs 32 formed therein. Central and edge pedestal strips 34,35 are provided. The central strips 34 are twice the width of the edge strips 35 so that when two modules 12 are abutted, two abutting edge strips will have a transverse dimension corresponding to the transverse dimension of a central pedestal strip 34. The pedestal strips 34,35 have longitudinal stiffening grooves 36. The base panels 30 and the pedestal strips 34,35 are welded together with their grooves 32,36 orthogonal to one another to provide bidirectional stiffening of the modules.

The central pedestal strip 34 includes central and end pedestals 38,40. The central pedestals 38 have oppositely tapered sides 42,44 and a flat top 45. In a system of the illustrative overall 4" height, the pedestal 38 at its base will be 4" square, while the top will have a width of 4" and a dimension longitudinal of the strip of 3". Each tapered pedestal side 42,44 is notched at 46 to receive projections 48 of the cable and communication panels 16,22 in snap-in supporting relationship.

Figure 3:
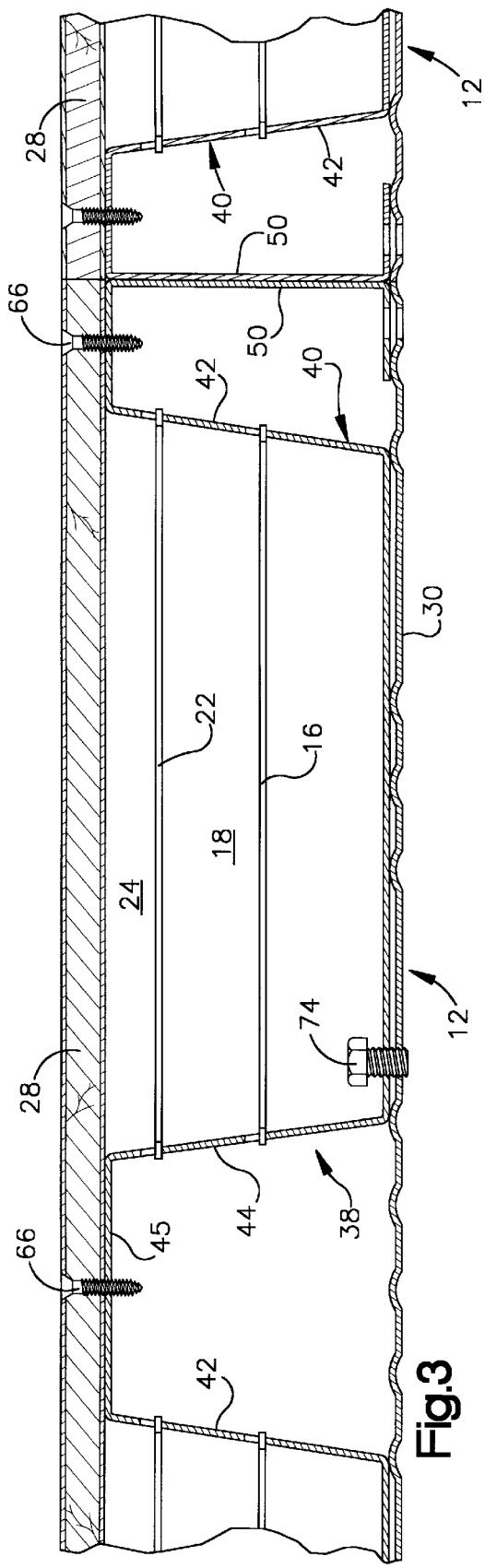
FIG. 3 is a sectional view of an assembled flooring system.

Each end pedestal 40 includes a vertical support side 50 which butts against a like vertical support side 50 of an adjacent module 12, as best seen in FIG. 3. As will be apparent from an examination of FIG. 3, two of the end pedestals 40 when abutted together provide a pedestal corresponding to a central pedestal 38.

The end strips 35 have half central pedestals 52 and quarter corner pedestals 54. When a set of modules 12 are installed, an abutting pair of the half central pedestals 52 together provide a pedestal corresponding to the central pedestals 38, while four of the corner pedestals 54 in abutting relationship also collectively provide a pedestal corresponding to the central pedestals 38. The half and corner pedestals 52,54 have notches 55 which when installed collectively provide notches equivalent to the notches 46.

In the preferred and disclosed embodiment as shown in FIG. 2, further strips in the form of cross strips 56 are provided. The cross strips 56 have central and end closures 58,60. The central and end closures 58,60 of the cross strip respectively nest within the central and side pedestals 38,52. The central and side closures 58,60 have vertical side walls 62 with upwardly and oppositely tapered edges such that the side walls 62 close side openings in the central and edge pedestals 38,52. Accordingly, the space within each pedestal in the preferred embodiment is enclosed except for the projection receiving notches 46. With this construction it is anticipated that the disclosed flooring system will satisfy many, if not most, building code requirements without further electrical conduits enclosing, for example, the electrical cable 20.

As shown in FIGS. 1, 2 and 5, the snap-in panels 16,22 each include a square knock out portion 64 which may be removed to gain access to service lines below the panel and to receive a standard 4×4 junction box for feeding, for example, a connection to the cable 20. To gain access to the three service chases, one simply removes screws 66 securing a floor panel section 28 to the pedestals and lifts the then disconnected floor panel out of the way. Where access is desired through one of the cable floor panels, the communication floor panel above it is removed by prying its projections 48 out of the notches 46 with a screw driver or other suitable prying tool.

Each knock out 64 includes four circular knock outs 68 which may be removed if one only needs to install a standard circular fitting. For example, a circular knock out will be removed to bring a cable connection through a standard fitting positioned in an aperture provided by removing one of the knock outs 68. A service line floor panel 69, FIGS. 9 and 10, is substituted for the removed floor panel 28 when service lines are to be fed through the floor.

Installation

Figure 7:
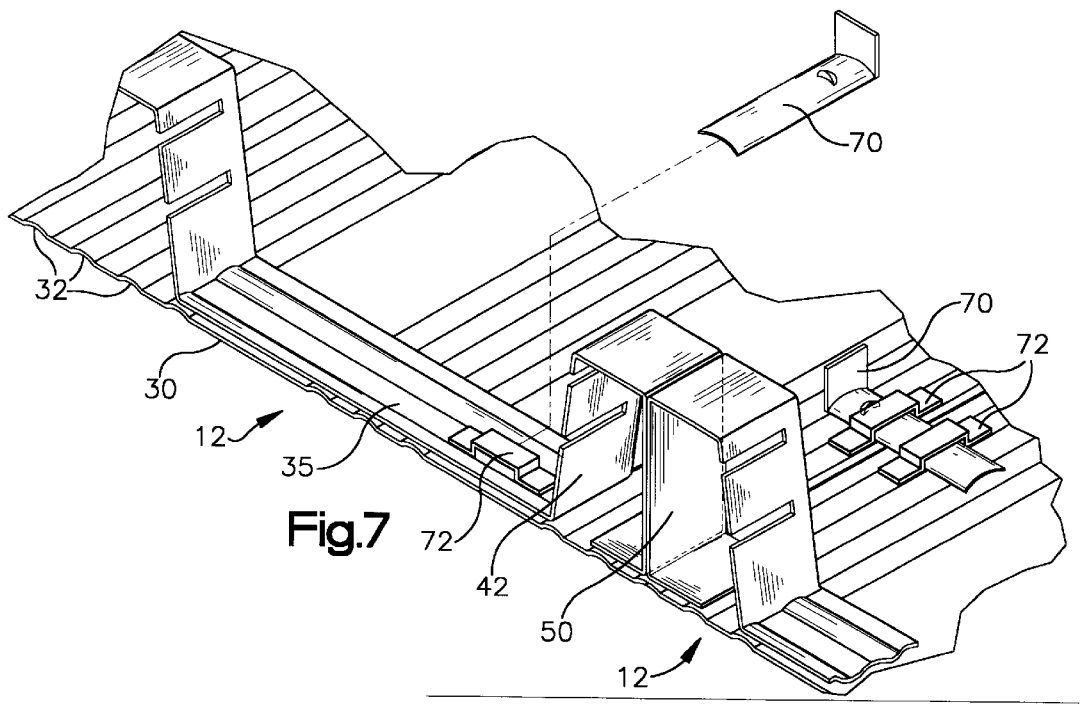
FIG. 7 is a fragmentary perspective view of base modules of the present invention showing the mechanism for locking the modules together.
Figure 4:
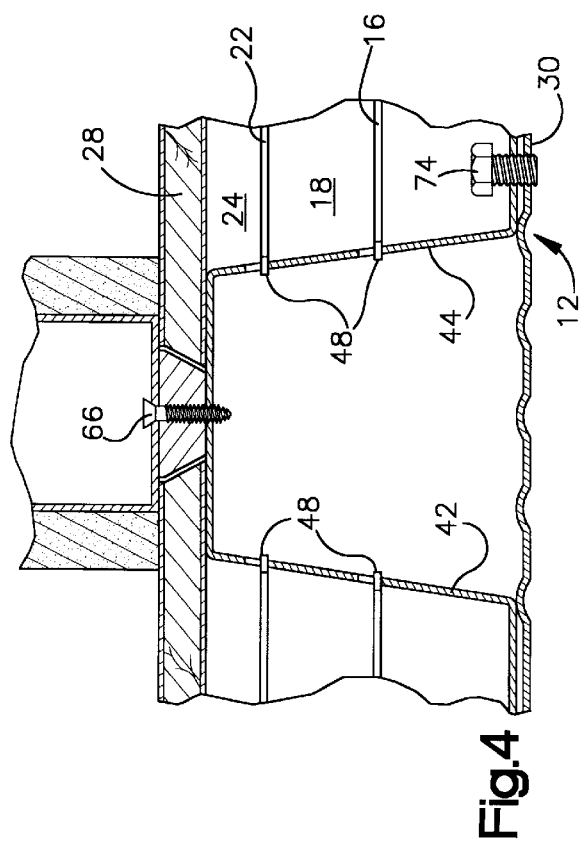
FIG. 4 is a sectional view of a portion of the flooring system with a partition wall mounted atop it.

With the preferred construction the modules 12 are each approximately 3' square, so that they are small and light enough that a single installer can handle them. The modules 12 are positioned in abutting relationship atop the floor of an existing building. Keys 70, FIG. 7, are slid into key slots 72 to secure adjacent modules together. If there is unevenness in the floor, leveling screws 73, FIGS. 3 and 4, threadedly carried by the base panels are adjusted.

Figure 8:
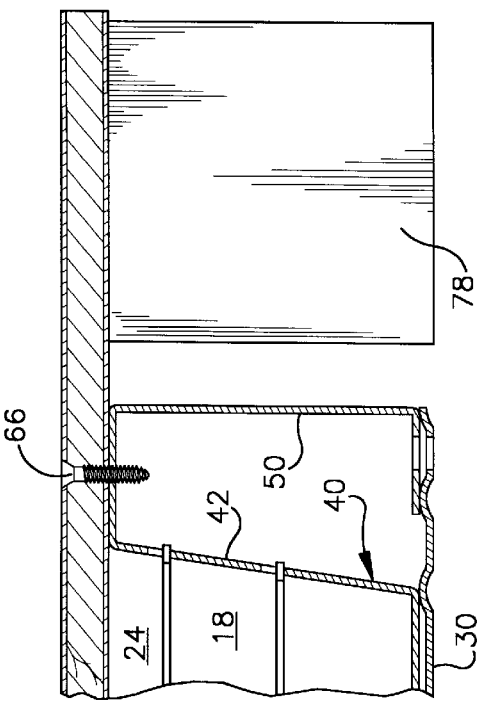
FIG. 8 is a fragmentary sectional view of a cantilevered floor portion and a supplemental pedestal.

For perimetral areas where full modules 12 will not fit, half and quarter modules 74,75 are provided, FIG. 6. If a half or quarter module will not fit because, for example, the space between in the installed modules and a wall or column is less than 18", cantilevered floor panels are used. In the preferred 3'×3' module arrangement, 36"×54" panels are provided. Such panels can be scribed and cut to a appropriate length at a job site to provide an appropriately dimensioned cantilevered portion. Where required supplemental pedestals 78, FIG. 8, are positioned to support the cantilevered portions. In a system of the size we have described, the supplemental pedestals are hollow, metal 3.5" cubes.

Once the modules have been positioned, interconnected and leveled, the installer has provided a geometric array of pedestals which are preferably 12" apart center to center as measured both longitudinally and transversely of the room in which the system is being installed.

Next, the supply, return and condensate conduits 14,15 are installed over the base floor. Once these water conduits are installed, the cable panels 16 are put in place with their projections 48 snapped into the notches 46,55 of the pedestals. Knock outs 64 or 68 are removed as required to interconnect the conduits 14,15 with a heat pump 85 and a source of suitable water, such as a building cooling tower 86, FIG. 1. The heat pump obviously will be installed at an appropriate time and at a location suitable to provide supplemental cooling for a work space in which employees and heat generating equipment will be present.

Next, electrical power cables or wires 20 are laid on the power cable panels and in the power cable chase 18. Communication panels 22 are now snapped into place and knock outs removed to provide appropriate connections with the power cables and wires 20 and the conduits 14,15. Communication conductors such as telephone lines and local area network connections 25,26 are now positioned in communication chase 24.

The floor panels 28 are positioned and secured by the screws 66. In the process of positioning the floor panels 28, service line floor panels 69 are used to feed connections from the conduits, cable and communication lines to the work space above the work floor being formed. Further, where perimetral portions are exposed, end panels 80 equipped with knock outs 82 are installed.

A retrofitted floor system installed in the described manner provides a system capable of fulfilling modern day and future service line requirements with minimal reduction in available space for equipment and personnel.

The Reinforcement Panel 69

Referring now to FIG. 9, the service line panel 69 includes a central, preferably 4" square, aperture 88. In order to provide a service panel 69 of sufficient structural strength and rigidity a reinforcement 90 is provided. The reinforcement 90 is formed from a single piece of steel to include three side sections 92 and two half side sections 94. As indicated by the showing in FIG. 9, these sections are interconnected in a fashion which permits relative movement such they may be folded into the shape shown in FIG. 9 to enable insertion into the aperture 88. Once inserted, upper and lower flanges overlie the top and bottom of the service line panel 69. The lower flanges 96 are secured to the surface panel 69 as by screws not shown passing through apertures 97 in the lower flanges. The side sections 90,92 define recessed channel portions 98 for support of an insert such as a junction box. The half side sections 94 are keyed at 99 for reinforcement at their juncture when installed as is best seen in FIGS. 10 and 11.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:

1. A supplemental flooring system for use in a building atop a building floor comprising:

a) a plurality of system floors;

b) pedestals for supporting the system floors in spaced relationship above a base to provide a room floor and an electrical cable support floor;

c) supply and return fluid conduits for positioning above the base; and, d) a heat exchanger for connection to the conduits to provide heating and cooling for a space above the room floor.

2. The system of claim 1, wherein the heat exchanger is adapted to provide supplemental heating and cooling selectively and one at a time.

3. The system of claim 1, wherein there are two cable support floors.

4. The system of claim 1, wherein the room floor includes knock-outs for access to cables on said cable support floor.

5. The system of claim 1, wherein the conduits are adapted to be connected to a source of water.

6. The system of claim 5, wherein the source is a building cooling tower.

7. A process of upgrading a workspace in a commercial building to supply electrical interconnections and supplemental heating and cooling comprising:
   a) installing a room floor and an electrical conductor support floor above a building floor;
   b) positioning liquid conducting conduits above the building floor;
   c) installing a heat pump in air circulation communication with the workspace; and,
   d) connecting the conduits to the heat pump and to a source of fluid.

8. The process of claim 7, wherein the source is a water cooling tower.

9. The process of claim 7, wherein the source supplies water at from about 60° F. to about 90° F.

10. A flooring system for installation on a building floor of an existing building comprising:
    a) a plurality of pedestal elements for mounting in a geometric array upon such building floor, each of the pedestal elements including sets of panel supporting surfaces of progressively smaller transverse dimension from a pedestal base to its top;
    b) a set of power cable support panel elements each engageable with certain of the surfaces for support by the pedestal elements to provide a cable floor above and spaced from such building floor;
    c) a plurality of communication conductor support panel elements each engageable with other of said surfaces at a level above the cable support elements to provide a conductor floor above and spaced from the cable floor, each of the said other of said surfaces being spaced inwardly of said certain of said surfaces of the same pedestal; and,
    d) a plurality of working floor panel elements for support by the pedestal elements to provide a working floor surface above and spaced from the conductor floor.

11. The system of claim 10, further including a plurality of fluid conduits for mounting above said building floor and below the cable and conductor floors.

12. The system of claim 10, wherein the pedestal elements are truncated pyramids.

13. The system of claim 10, wherein the panel supporting surfaces are provided by pedestal notches.

14. A process of installing a flooring system on the floor of an existing building comprising:
    a) supporting a plurality of pedestals above the floor and arranging the pedestals in a geometric array;
    b) laying at least one first utility line above the building floor;
    c) engaging cable support panels with support surfaces defined by the pedestals to form a cable support floor above and in spaced relationship with the building floor and the line;
    d) positioning at least one second utility line on the cable support floor;
    e) engaging communication conductor support panels of horizontal dimensions greater than the cable support panels with further surfaces defined by the pedestals to form a conductor support floor above and spaced from the cable support floor and said at least one second line;
    f) positioning at least one third utility line on the conductor support floor;
    g) supporting a plurality of working floor panels on the pedestals to form a working floor above and spaced from the cable support floor and said at least one third utility line, the horizontal dimensions of the working floor panels also being greater than the horizontal dimensions of the cable support panels; and,
    h) accessing at least one of the utility lines through an aperture in one of the floors.

15. The process of claim 14, further including the step of removing a knock-out to form the aperture.

16. The process of claim 14, further including the step of positioning a walking surface providing layer on the working floor.

17. The process of claim 14, further including the step of interconnecting a heat pump with a water supply via said at least one said fluid conduit.

18. The process of claim 17, wherein water from the water supply is at a temperature from about 60° F. to about 90° F. when the system is in use.

19. The process of claim 17, wherein the water supply is a cooling tower.

20. The process of claim 14, further including the step of adjusting leveling screws operably connected to the pedestals to compensate for an uneven or unlevel existing building floor.

21. In combination with a building, a flooring system installed on a floor of the building comprising:
    a) a plurality of pedestal elements mounted in a geometric array above the building floor, each of the pedestals including sets of panel supporting surfaces;
    b) a set of power cable support panel elements each engaging a plurality of the surfaces and supported by the pedestal elements and providing a cable floor above and spaced from the building floor;
    c) a plurality of communication conductor support panel elements each engaging another plurality of the surfaces at a level above the cable support elements and providing a conductor floor above and spaced from the cable floor;
    d) a plurality of working floor panel elements supported by the pedestal elements and providing a working floor surface above and spaced from the conductor floor and,
    e) at least two fluid conduits extending above the building floor and below the cable floor for connection to a heat exchanger.

22. The combination of claim 21, further including a base floor interposed between the pedestal elements and the floor of the building.

23. The combination of claim 22, wherein the base floor comprises a plurality of base panels and lock elements interconnecting the base panels.

24. The combination of claim 22, wherein a selected one of the base floor and the pedestal elements includes leveling screws.

25. The combination of claim 21, wherein one of the pedestals is interconnected components of a pedestal strip having stringer connections each interposed between and connected to a different pair of pedestals to maintain each such pedestal pair in predetermined spaced relationship.

26. A support system for multiple floors of a sub-work surface utility line containment system comprising:
   a) a plurality of pedestal sets;
   b) each set including a plurality of pedestals interconnected by strips;
   c) a base floor for mounting on a floor of a building to be provided enhanced utility service; and,
   d) the pedestal sets being connected to the base floor and adapted to provide a geometric array of floor support pedestals.

27. The system of claim 26, wherein each of the pedestals includes a plurality of floor panel support surfaces for supporting utility support floor panels.

28. The system of claim 27, wherein each of pedestals includes top surfaces for support of work floor panels.

29. The system of claim 26, wherein each of pedestals includes top surfaces for support of work floor panels.

30. A base floor module for use in a retrofit flooring system comprising:
   a) base panels each having a plurality of generally parallel transversely disposed stiffening ribs;
   b) pedestal strips having a plurality of longitudinally disposed stiffening ribs and upstanding pedestals each adapted to support floor components; and,
   c) each of the strips being connected to at least one of the panels with their respective ribs orthoganally disposed whereby to provide a substantially rigid flooring module.

31. The base floor of claim 30, wherein the pedestals each have notches for receipt of parts of floor components.

32. The base floor of claim 30, wherein the module includes tie receiving structure for receiving ties to fix a plurality of such modules together in side by side relationship.

33. The base floor module of claim 30, wherein selected ones of the panels and strips include threaded apertures for receipt of leveling screws.

34. In combination with a plurality of the base floor modules of claim 30 an electrical conductor support floor, a signal conductor support floor, and a working surface support floor each supported by pedestal portions of the strips.

35. A flooring system for installation on a building floor of an existing building comprising:
   a) a plurality of pedestal elements for mounting in a geometric array upon such building floor, each of the pedestals including a plurality of panel supporting surfaces;
   b) a set of first electrical conductor support panel elements each supportable on a first plurality of said supporting surfaces for support by a plurality of the pedestal elements to provide a first conductor floor above and spaced from such building floor;
   c) a plurality of second electrical conductor support panel elements supportable on another plurality of said supporting surfaces at a level above the cable support elements to provide a second conductor floor above and spaced from the first floor;
   d) each surface of said another plurality of surfaces being spaced inwardly from a surface of said first plurality of the same pedestal whereby the first conductor elements can be lowered past said another plurality of surfaces; and,
   e) a plurality of working floor panel elements for support by the pedestal elements to provide a working floor surface above and spaced from the conductor floors.

36. The system of claim 35, further including a plurality of fluid conduits for mounting above such building floor and below the conductor floors.

37. The system of claim 35, wherein the pedestal elements are truncated pyramids.

38. The system of claim 35, wherein the panel supporting surfaces are provided by pedestal notches.

39. A process of installing a flooring system on the floor of an existing building comprising:
   a) supporting a plurality of pedestals above the floor and arranging the pedestals in a geometric array;
   b) laying first utility lines in the form of at least one fluid conduit above the building floor;
   c) supporting a first set of panels on surfaces of the pedestals to form a first conductor support floor above and in spaced relationship with the building floor and the conduits;
   d) positioning second utility lines in the form of at least one first electrical conductor on the first conductor support floor;
   e) mounting second conductor support panels on further surfaces of the pedestals to form a second conductor support floor above and spaced from the first conductor support floor and said at least one first conductor;
   f) positioning third utility lines in the form of at least one second electrical conductor on the second conductor support floor;
   g) supporting a plurality of working floor panels on the pedestals to form a working floor above and spaced from the second conductor support floor and said at least one second conductor; and,
   h) accessing at least one of the utility lines through an aperture in one of the floors.

40. The process of claim 39, wherein said panel supporting step provides three further floors.

41. The process of claim 39, further including the steps of positioning fluid conduits on the building floor and positioning power cables and equipment lines respectively on different ones of the further floors beneath a working surface of one of the further floors.

42. The process of claim 39, further including the step of removing a knock-out to form the aperture.

43. The process of claim 39, further including the step of positioning a walking surface providing layer on the working floor.

44. The process of claim 43, further including the step of interconnecting a heat pump with a water supply via said at least one fluid conduit.

45. The process of claim 44, wherein water from the water supply is at a temperature from about 60° F. to about 90° F. when the system is in use.

46. The process of claim 44, wherein the water supply is a cooling tower.

47. A process of installing a supplemental flooring system in an existing building comprising:
   a) forming a base floor by placing a plurality of base floor modules in juxtaposed relationship on an existing floor such that panels of the modules form a base floor;
   b) securing the modules together by connecting ties to juxtaposed pairs of modules;
   c) supporting further panels on pedestal portions of the modules to provide further floors above the base floors; and,
   d) positioning fluid conduits on the base floor and positioning power cables and equipment lines respectively on different ones of the further floors beneath a working surface one of the further floors.

48. In combination with a building, a flooring system installed on a floor of the building comprising:

(a) a plurality of pedestal elements mounted in a geometric array above the building floor, each of the pedestals including sets of panel receiving notches;

(b) a set of power cable support panel elements each projecting into a plurality of the notches and supported by the pedestal elements and providing a cable floor above and spaced from the building floor;

(c) a plurality of communication conductor support panel elements each projecting into another plurality of the notches at a level above the cable support elements and providing a conductor floor above and spaced from the cable floor, each of the conductor support elements being of larger area than one said single element directly below it; and, (d) a plurality of working floor panel elements supported by the pedestal elements and providing a working floor surface above and spaced from the conductor floor each of the working floor elements being of larger area than one said conductor support element directly below it.

49. In combination with a building, a flooring system installed on a floor of the building comprising:

(a) a plurality of pedestal elements mounted in a geometric array above the building floor, each of the pedestals including sets of panel receiving notches;

(b) a set of power cable support panel elements each projecting into a plurality of the notches and supported by the pedestal elements and providing a cable floor above and spaced from the building floor;

(c) a plurality of communication conductor support panel elements each projecting into another plurality of the notches at a level above the cable support elements and providing a conductor floor above and spaced from the cable floor;

(d) a plurality of working floor panel elements supported by the pedestal elements and providing a working floor surface above and spaced from the conductor; and, (e) certain of the pedestals being interconnected components of a pedestal strip having stringer connections each interposed between and connected to a different pair of pedestals to maintain each such pedestal pair in predetermined spaced relationship.

50. In combination with a building, a flooring system installed on a floor of the building comprising:

(a) a plurality of pedestal elements mounted in a geometric array above the building floor, each of the pedestals including sets of panel receiving notches;

(b) a set of power cable support panel elements each projecting into a plurality of the notches and supported by the pedestal elements and providing a cable floor above and spaced from the building floor;

(c) a plurality of communication conductor support panel elements each projecting into another plurality of the notches at a level above the cable support elements and providing a conductor floor above and spaced from the cable floor;

(d) a plurality of working floor panel elements supported by the pedestal elements and providing a working floor surface above and spaced from the conductor; and, (e) certain of the pedestals being interconnected components of a pedestal strip having stringer connections each interposed between and connected to a different pair of pedestals to maintain each such pedestal pair in predetermined spaced relationship.

* * * * *